United States Patent
Sun et al.

(10) Patent No.: US 10,009,247 B2
(45) Date of Patent: Jun. 26, 2018

(54) STREAMING VIDEO MONITORING USING CDN DATA FEEDS

(71) Applicant: Tektronix, Inc., Beaverton, OR (US)

(72) Inventors: Quenie Q. Sun, Allen, TX (US); Seshu Dommaraju, Plano, TX (US)

(73) Assignee: NETSCOUT SYSTEMS TEXAS, LLC, Westford, MA (US)

( * ) Notice: Subject to any disclaimer, the term of this patent is extended or adjusted under 35 U.S.C. 154(b) by 172 days.

(21) Appl. No.: 14/255,695

(22) Filed: Apr. 17, 2014

(65) Prior Publication Data

US 2015/0304196 A1    Oct. 22, 2015

(51) Int. Cl.
*H04L 12/26* (2006.01)
*H04N 21/643* (2011.01)
*H04N 21/647* (2011.01)
*H04L 29/06* (2006.01)
*H04N 17/00* (2006.01)

(52) U.S. Cl.
CPC .......... *H04L 43/0876* (2013.01); *H04L 65/60* (2013.01); *H04N 21/64322* (2013.01); *H04N 21/64723* (2013.01); *H04N 17/004* (2013.01)

(58) Field of Classification Search
CPC ............................ H04L 43/0876; H04H 60/32
See application file for complete search history.

(56) References Cited

U.S. PATENT DOCUMENTS

| | | | | |
|---|---|---|---|---|
| 8,599,684 B1* | 12/2013 | Goertz | .................... | H04L 43/10 370/229 |
| 2012/0163203 A1* | 6/2012 | Wilkinson | .......... | H04L 41/5025 370/252 |
| 2013/0031575 A1* | 1/2013 | Gallant | ............... | H04L 41/5038 725/20 |
| 2013/0067109 A1* | 3/2013 | Dong | .................. | H04L 65/4069 709/231 |
| 2014/0119196 A1* | 5/2014 | Hui | ........................ | H04W 24/10 370/241 |
| 2015/0200821 A1* | 7/2015 | Sade | ..................... | H04L 67/141 709/224 |

OTHER PUBLICATIONS

Extended European Search Report for European Patent Application No. 15163859.0, dated Aug. 15, 2015.

* cited by examiner

*Primary Examiner* — Sargon Nano
*Assistant Examiner* — Sanjoy Roy
(74) *Attorney, Agent, or Firm* — Locke Lord LLP; Scott D. Wofsy; Christopher J. Capelli

(57) ABSTRACT

A method for monitoring streaming video content is provided. Content Delivery Network (CDN) feed sent over one or more CDNs is monitored and analyzed using a first soft probe deployed in the one or more CDNs to generate a first video session record. Video traffic sent over a packet core network (PCN) is monitored and analyzed using a second soft probe deployed in the PCN to generate a second video session record. A third session record is generated by correlating the first session record to the second session record. The third session record corresponds to an end-to-end video streaming session. One or more performance characteristics corresponding to the end-to-end video streaming session are generated based at least in part on the third session record.

20 Claims, 6 Drawing Sheets

STREAMING VIDEO MONITORING USING CDN DATA FEEDS

FIELD OF THE INVENTION

Embodiments of the present invention relate to sending streaming video on the Internet and, more particularly, to streaming video monitoring using Content Delivery Network (CDN) data feeds.

BACKGROUND OF THE INVENTION

Modern cellular networks are evolving rapidly. Over the past few years, with the advent of smart mobile devices, a huge increase of data consuming applications, and a manifold increase in the capacity of cellular network bandwidth, users in cellular networks have become extremely data hungry. Traffic from mobile video alone is projected to exceed current total mobile traffic. Moreover, video streaming services are expected to constitute a major portion of the mobile video traffic. Together, a wide range of video delivery services and a surge in the quality of videos account for this phenomenon. As more devices become mobile, demand by users for video delivered to their mobile devices is expected to increase.

It is noted rapid growth in video traffic is posing service assurance challenges to CSPs. Service degradation issues, if unresolved in a timely manner, may result in subscriber churn. As content delivery models move away from streaming distribution over private networks to Web-based delivery of files over the public Internet, referred to as Over-The-Top (OTT) delivery, traditional streaming video paradigms are constantly modified to support new delivery protocols, e.g., Hypertext Transfer Protocol (HTTP) Live Streaming. Even in scenarios where video is played using OTT delivery, the end user expectation is that OTT service should work seamlessly irrespective of the medium and device it is being consumed on. Typically, service providers need to ensure that a given video stream is fully functional and operational across all stages of end-to-end content delivery to the end users.

Video data has characteristics that differ from characteristics of many other types of data, such as email or data used with web browsing. Video data, in particular, is consumed according to specific timing. If video data is not timely delivered to its destination, a video session playing back the video will freeze. In this case, impact on the Quality of Experience for the video session is much greater than what a similar delay may cause with other types of data. However, video quality can be degraded at any stage from video production to end user consumption. Thus, to ensure end user satisfaction the CSPs typically need to proactively monitor and fix the issues almost in real time to prevent video service degradation.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for monitoring streaming video content is provided. Content Delivery Network (CDN) feed sent over one or more CDNs and collected by one or more first soft probes deployed in the one or more CDNs is monitored and analyzed to generate a first video session record. Streaming video traffic sent over a packet core network (PCN) and collected by one or more second soft probes deployed in the PCN is monitored and analyzed to generate a second video session record. A third session record is generated by correlating the first session record to the second session record. The third session record corresponds to an end-to-end video streaming session. One or more performance characteristics corresponding to the end-to-end video streaming session are generated based at least in part on the third session record.

In another aspect, a computer program product for monitoring streaming video content is provided. The computer program product comprises one or more computer-readable storage devices and a plurality of program instructions stored on at least one of the one or more computer-readable storage devices. The plurality of program instructions includes program instructions to monitor and analyze Content Delivery Network (CDN) feed sent over one or more CDNs and collected by one or more first soft probes deployed in the one or more CDNs to generate a first video session record. The plurality of program instructions further includes program instructions to monitor and analyze streaming video traffic sent over a Packet Core Network (PCN) and collected by one or more second soft probes deployed in the PCN to generate a second video session record. The plurality of program instructions further includes program instructions to generate a third session record by correlating the first session record to the second session record. The third session record corresponds to an end-to-end video streaming session. The plurality of program instructions further includes program instructions to generate one or more performance characteristics corresponding to the end-to-end video streaming session based at least in part on the third session record.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
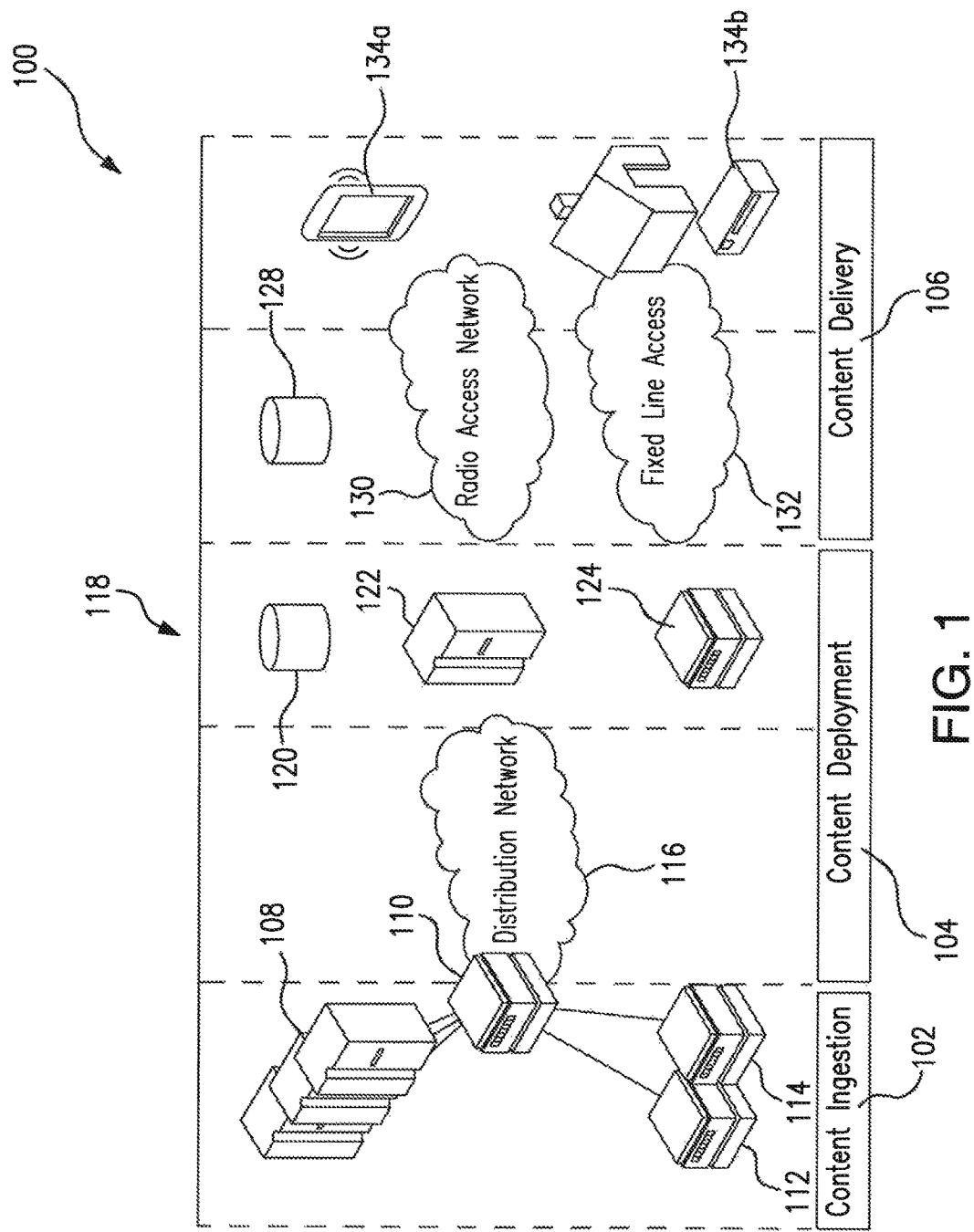
FIG. 1 is a diagram of streaming video delivery in a communication network in accordance with embodiments of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Described embodiments of the present invention concern a cost effective method to monitor and assure quality of streaming video services provided by a plurality of content providers, such as, but not limited to, streaming television video web portals. Streaming television video web portals include Netflix™, Hulu™, Veoh™, websites of CBS™, ABC™ Disney™, and many others. Even cable operators such as Comcast™ offer online streaming television videos on their websites, such as Xfinity™. The disclosed cost-effective and service agnostic method addresses QoS aspects of video streaming by tracing user video sessions and by providing a collection of near real-time performance characteristics (objective measures or Key Performance Indicators (KPIs)). The described embodiments of the present invention allow the end to end (E2E) correlation of users' video sessions and service/network faults across delivery media.

Referring to FIG. 1 of the drawings, there is shown a diagram of video delivery in a communication network in accordance with embodiments of the present invention. Typically, a content provider does not directly deliver content to a consumer. Instead, the process typically involves three stages: content ingestion 102, content deployment 104 and content delivery 106. Within this document, content includes streaming television programming, movies, music, games, images, special features, scheduled media, on-demand and/or pay-per-view media. It is noted that streaming video content may include at least one of standard definition video content or high definition video content. As described herein, the term, "content" is distinguished from the term, "content information" that is related to, but separate from the content itself. The term "content information," which may include metadata, refers to information associated with or related to one or more items of content and may include information used to access the content. Streaming video content generated by one or more content providers is typically sent to a content distributor, which uses a CDN 116 to deliver content to the content consumer.

A content ingestion system 102 typically receives content from one or more content providers. The reception of new content may then initiate video encoding to start. Video encoding may be performed by one or more video encoders 108. The encoding includes spatial compression of still images in the digital video image stream and temporal compression between the still images. It is noted that video can be found in a number of formats, from uncompressed HD-SDI (High Definition Serial Digital Interface) to the MPEG (Moving Picture Experts Group) −4 AVC (Advanced Video Codec). The former will be running at a speed of approximately 1.485 Gbps, whereas the latter will be approximately 8 Mbps. To make such a considerable bandwidth reduction, a remarkable amount of compression should take place. Consequently, the content ingestion system 102 may contain encoders 108 designed specifically for this processor intensive task, either encoding uncompressed video/audio or re-encoding video/audio to a lower rate. A particular content ingestion system illustrated in FIG. 2 may provide additional services, such as multiplexing.

It should be noted that video service providers can receive content streams from a number of sources (content providers), which typically should be combined into a suitable transport stream (the transport stream is a multiplex structure carrying one or more services, all multiplexed together). This is termed multiplexing and as such, the content ingestion system 102 will often contain multiplexers 110 designed specifically for this task. Multiplexers 110 can typically cherry pick from incoming content, allowing the service provider to deliver services with multiple video and audio streams, alter ancillary data and also encrypt services as appropriate. In one example, content providers may transmit video content by streaming the video content in a manner that encrypts the video content as the video content is being ingested. Encryption, such as CAS (Conditional Access System), is the term given to the encryption process which ensures viewers can only access the content they have paid for. Consequently, the content ingestion system 102 is one place where CAS can be implemented for example by a CAS device 112. Generally, video content is not delivered to the video service provider with advertisements already included. Consequently, advertisements can be spliced into the video streams using a technique called ad insertion or DPI (Digital Program Insertion). Ad insertion can be carried out on a national basis by a DPI device 114 at the content ingestion system 102, or on a local basis, by a regional DPI device 124 at the regional head end 118 in order to add local advertising.

After completing encoding, encryption, ad insertion, multiplexing and other similar services, the multiplexer 110 may transmit video content to content deployment system 104. According to one embodiment of the present invention, the content deployment system 104 may comprise a CDN 116 and a regional headend 118. Broadly speaking, CDN 116 is a system of computers containing copies of data placed at various nodes of a network. CDN 116 is a key component in streaming video architecture. When properly designed and implemented, CDN 116 can improve access to the data it caches by placing a number of copies closer to end users resulting in increased access bandwidth to the data, better scaling, resiliency and reduced latency. CDN 116 may be considered to be the center piece for content deployment as it is capable of transmitting a large volume of content from the content ingestion system 102 to content delivery system 106. CDNs 116 are typically deployed in a distributed network configuration to serve the user community across and entire geographic area and to support load sharing, reliability and fault resistance of the provided video service. In an embodiment of the present invention, one or more CDNs 116 may be implemented in one or more cloud computing environments.

CDN 116 typically contains surrogate servers with copies of video content, positioned at various network points so as to achieve optimal bandwidth and network utilization for clients accessing the content. In an embodiment of the present invention, the default mechanism of delivery in the CDN 116, i.e., unicast, such as HTTP, can be used as a delivery mechanism. In an alternative embodiment, the multicast channel can be implemented as broadcast channel in the CDN 116, such as a radio frequency terrestrial channel or high frequency satellite channel. As previously indicated, the content deployment system 104 includes a regional headend 118. The regional headend 118 is connected to consumer devices 134 via content delivery system 106. The regional headend 118 of the content deployment system 104 may include a plurality of servers/devices, such as, but not limited to, a video on demand (VoD) server 120, a regional remultiplexer and encoder 122 and a regional DPI device 124. With VoD, video content consumers can gain access to a menu of available programs which they can choose to watch as and when they see fit. This requires a different approach in the CDN 116, since the service provider will not be able to predict when and where a particular piece of video content needs to be delivered. Consequently, VoD services typically need to support thousands of unicast sessions to individual subscribers. Therefore, VoD servers 120 should have high storage capacity and have the ability to handle large amounts of connections simultaneously.

A content delivery system 106 is typically responsible for transmitting video content to video content consumers. The content delivery system 106 may include, for example, edge streaming servers and various types of access networks delivering content to a plurality of end user's video consumption devices 134. As shown in FIG. 1, the content delivery system 106 may include a plurality of edge caching servers 128. Edge caching refers to the use of caching servers (also known as edge streaming servers) 128 to store content closer to end users.

In one embodiment of the present invention, the video content can be transported from regional headends 118 to mobile user devices 134a via a mobile access network 130. The mobile network 130 may be a Global System for Mobile (GSM) network, General Packet Radio Service (GPRS) network, EDGE network, High Speed Downlink Packet Access (HSDPA) network, Code Division Multiple Access (CDMA) network, Long Term Evolution (LTE) network or an Advanced LTE network. The mobile network 130 may also comprise a MBMS (Multicast Broadcast Multimedia Service) network or DVB-H (Digital Video Broadcasting-Handheld) network. The MBMS network structure is based on a core network of GPRS, added with additional network elements. DVB-H is a technical specification for bringing broadcast services to handheld devices 134a, such as, but not limited to, handheld receivers, terrestrial televisions (TV), portable TVs, mobile phones, among other mobile terminals. DVB-H can offer a downstream channel at high data rates to be used as standalone or as an enhancement of mobile telecommunication networks for typical handheld terminals. DVB-H systems are characterized by Multi-Protocol Encapsulation-Forward Error Correction (MPE-FEC), which is an additional error correction coding for IP packets.

In an alternative embodiment, the video content can be transported from regional headends 118 to set top boxes 134b via various fixed line (i.e., wired) access networks 132. Wired access networks 132 may include two-wire xDSL (e.g., ADSL, ADSL2, VDSL, VDSL2), coaxial cable (e.g., via DOCSIS 1.1, 2.0, 3.0), optical fiber-to-the-home/premises (FTTH/FTTP), and possibly broadband over power lines (BPL).

Figure 2:
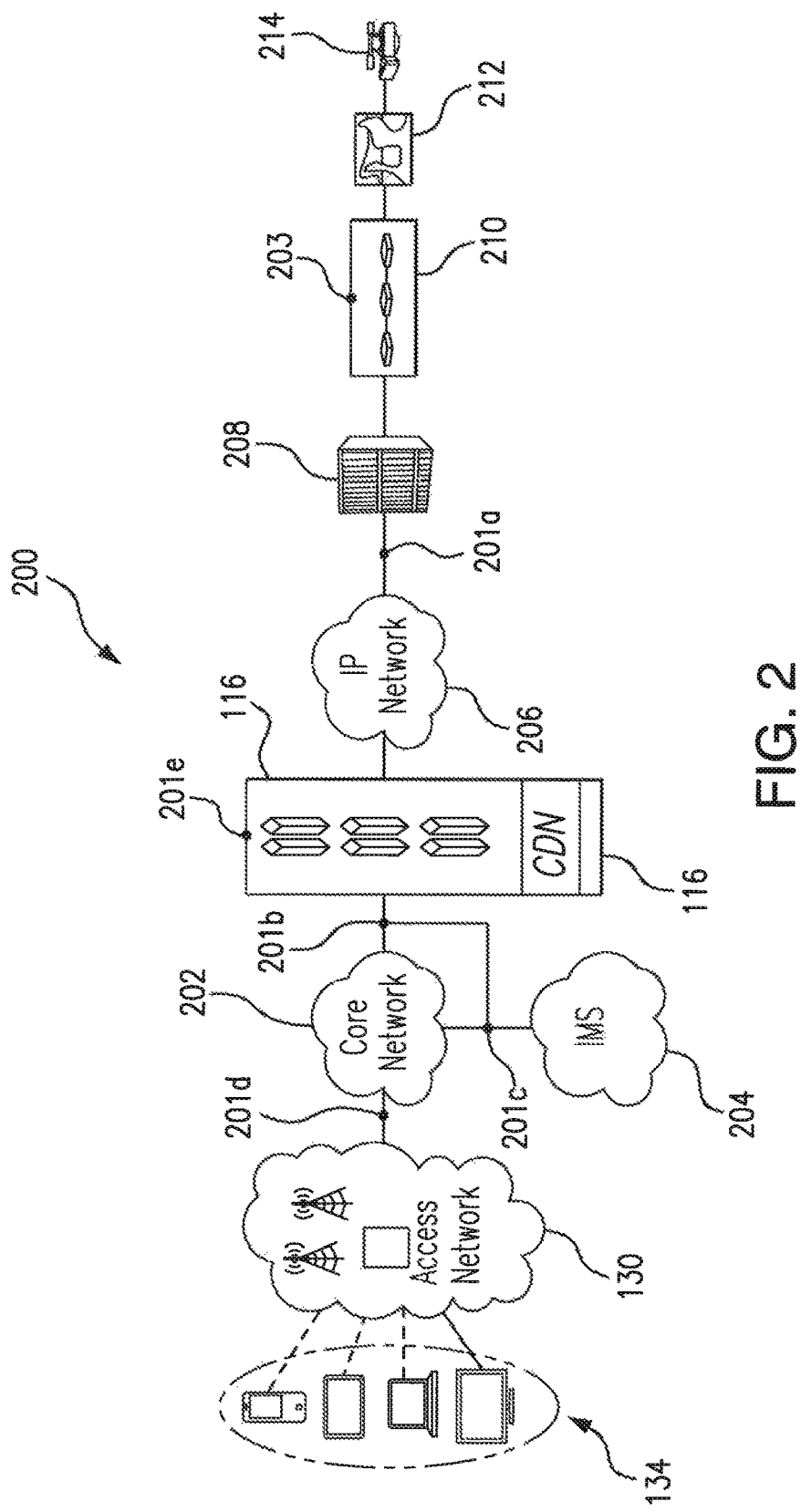
FIG. 2 is a simplified block diagram illustrating video traffic monitoring in the communication network, in accordance with an illustrative embodiment of the present invention.

FIG. 2 is a simplified block diagram illustrating video traffic monitoring in a communication network 200, in accordance with an illustrative embodiment of the present invention. As shown in FIG. 2, various content providers may provide digital signals, for example, in the form of streaming digital video 212 produced by a digital video camera 214 or by other means of producing digital signal. Video streaming environments typically present many challenges. For instance, target video content consumption devices 134 can have different display, power, communication, and computational capabilities. In addition, wireless communication links in wireless access network 130 can have different maximum bandwidths, quality levels, and time-varying characteristics. Thus, successful video streaming network architecture, such as the illustrative communication network 200, should be able to stream video to heterogeneous target video content consumption devices 134 over time-varying wireless communication links, and this streaming should be performed in a scalable manner. Scalability is needed to enable streaming to a multitude of devices 134 with different device capabilities. Thus, in order to achieve scalability and efficiency in wireless streaming environments, streaming video service providers should be able to easily adapt or transcode the compressed video stream 212 at various components 210 of content ingestion system 102 and/or at some intermediate network nodes. A transcoder takes a compressed video signal as the input then processes it to produce another compressed video stream as the output. Sample transcoding operations include bitrate reduction, rate shaping, spatial downsampling, frame rate reduction, and changing compression formats.

Besides transcoding, the ingestion system components 210 may perform additional services. More specifically, as described above with reference to FIG. 1, in conventional video streaming approaches that employ application-level encryption, video is first encoded into a bitstream using interframe compression algorithms. These algorithms include, for example, the MPEG standard, the International Telecommunications Union (ITU) standard, H.263, or intra-frame compression algorithms such as, for example, the Joint Photographic Experts Group (JPEG) or JPEG2000 standards. The resulting bitstream is then encrypted, and the resulting encrypted stream may be packetized and transmitted to an origin server 208 using, for example, a transport protocol such as Unreliable Datagram Protocol (UDP). The origin servers 208 may be coupled to the CDN 116 via an IP network 206 as part of the CDN 116. The origin server computer 208 may be configured to store a first copy of a video stream and may act as an authoritative repository or master storage location for digital media files. The origin server computer 208 may store the video stream in any technically feasible fashion on technically feasible media. For example, the origin server 208 may include a mass storage unit that may comprise a Redundant Array of Independent Disks (RAID) system incorporating a conventional file system. It is noted that FIG. 2 is in no way intended to limit the scope of the present invention. For example, in addition to the origin server 208 the CDN network 116 may include the above described edge nodes 128 (shown in FIG. 1) and a plurality of intermediary nodes.

FIG. 2 also shows an example core network 202 that may be used within the illustrative communication network 200. The core network 202 may facilitate CDN 116 communications with other networks. For example, the core network 202 may include, or may communicate with, an IP gateway, (e.g., an IP Multimedia Subsystem (IMS) server 204), that serves as an interface between the core network 202 and other access networks 130. As described above with reference to FIG. 1, the access network 130 may include other wired or wireless networks that are owned and/or operated by other service providers.

As a plurality of CDN servers (including origin servers 208) transport a plurality of video streams to client devices 134 through the communication network 200 shown in FIG. 2, this plurality of video streams may be monitored as the data packets comprising each video stream pass through various parts of the communication network 200. In an embodiment of the present invention, such monitoring may be facilitated by a plurality of monitoring soft probes 201. In an embodiment of the present invention, the plurality of monitoring soft probes 201 may be coupled to one or more network interfaces. The monitoring soft probes 201 passively capture messages, data packets, or Protocol Data Units (PDUs) from the interfaces without interfering with the operation of communication network 200. The soft probes 201 process the captured data immediately and/or pass the data to a central monitoring server 313 shown in FIG. 3. As shown in FIG. 2, this first type of soft probes 201 may be deployed in different parts of the communication network 200. For example, one soft probe 201a may monitor the link between the origin server 208 and the IP network 206, another soft probe 201b may monitor the link coupling the CDN 116 with the core network 202 and yet other soft probes 201c and 201d may monitor connections between the core network 202 and the IMS server 204 and between the core network 202 and access network 130, respectively. It is noted that hardware probes 203 coupled to the various components 210 at the production end may be able to perform both passive and active monitoring prior to the encryption of originating video streams.

It is further noted that a single end user's streaming video session may involve multiple servers in the CDN network 116 due to load balancing and/or throughput gearing up or down, for example. Thus, while the concept of monitoring various parts of the communication network is well-known in the art, in order to monitor video quality end-to-end from the production end 210 to target video content consumption devices 134, it becomes imperative to gain visibility of the content deployment stage described above. Although it is possible to monitor traffic within the CDN 116 (i.e. traffic coming in and/or going out of each CDN server) using a hardware probes, the analytical information obtained by such hardware probes is limited to packet analysis due to video stream encryption.

Various embodiments of the present invention advantageously contemplate monitoring one or more CDN feeds within the CDN 116 by employing a special type of soft probes, referred to herein as CDN feed soft probes 201e that may be deployed in one or more CDNs 116. According to embodiment of the present invention, unlike probes that require specialized hardware, the CDN feed soft probes 201e may be software based. These CDN feed soft probes 201e may be configured to obtain trace feed information instead of live traffic information from third party network equipment. In various embodiments, the format of the obtained feed can be either standardized or proprietary. A number of mechanism can be used by the CDN feed soft probes 201e to collect CDN feed, some of which are described below with reference to FIG. 5. It is noted that since CDN feed soft probes 201e can be deployed at large scale within the CDN 116, the approach disclosed herein provides a cost-effective way of collecting video delivery and usage statistics from the CDN 116.

Figure 3:
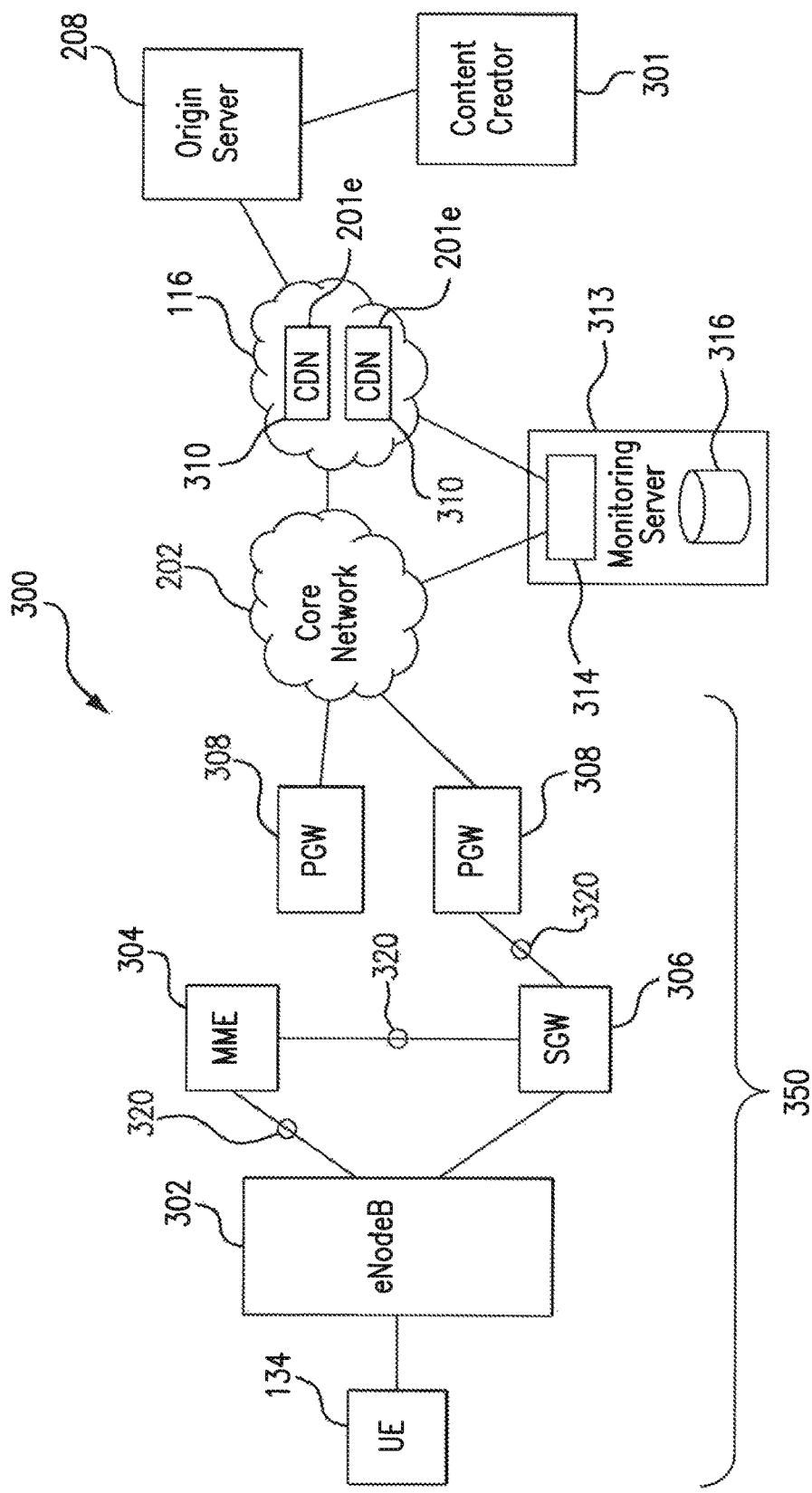
FIG. 3 is another block diagram illustrating video traffic monitoring in a communication network, in accordance with an illustrative embodiment of the present invention.

FIG. 3 is another block diagram illustrating video traffic monitoring in a communication network, in accordance with an illustrative embodiment of the present invention. More specifically, FIG. 3 illustrates in more details monitoring the packet core portion 350 of the communication network 300 in which various embodiments of the present invention may be implemented. As discussed above, one or more content providers 301 may generate digital video content at the production end and may upload such content into one or more origin servers 208, which may be a part of CDN 116. The CDN 116 may include a plurality of additional servers 310, such as surrogate servers, caching servers, and the like. The core network 202 may facilitate CDN 116 communications with other networks, such as access networks 130 shown in FIGS. 1 and 2, referred to herein as packet core network 350. In one exemplary embodiment, the packet core 350 may be implemented using an LTE network.

The $3^{rd}$ Generation Partnership Project (3GPP) oversees and governs $3^{rd}$ Generation (3G) networks, including 3G LTE networks. 3G LTE provides mobile broadband to User Equipment (UE) 134 (also referred to herein as end user devices and target video content consumption devices) within the 3G LTE network at higher data rates than generally available with other networks.

FIG. 3 depicts a 3G LTE wireless network 350, comprising, for example, an Evolved Packet Core (EPC) and an Evolved-UMTS Terrestrial Access Network (E-UTRAN). The E-UTRAN includes a User Equipment (UE) 134 (in this case, a mobile terminal, such as a cellular telephone, "smartphone" or any other device capable of rendering video content) in handover from a source Evolved Node Base Station (eNodeB) to a target eNodeB. For simplicity only one eNodeB 302 is depicted in FIG. 3. The eNodeB 302 is the access points for UE 134 connectivity to the communication network 300. The eNodeB 302 is similar to a base station in 3G/UMTS networks, but in addition to having Layer 1 and Layer 2 functionality, it also has Layer 3 functionality so that it can connect directly to the core of the network, rather than through a controller, as base stations do in 3G/2G networks.

In LTE E-UTRAN, user mobility is controlled by the network with assistance from the UE 134. Handover decisions, as well as the choices for the target cell and technology (when applicable), are made by the current serving eNodeB 302, based on measurements made by the eNodeB 302, and also based on measurements reported by the UE 134 to the eNodeB 302. LTE E-UTRAN provides several interfaces to reduce packet loss during handover from a source eNodeB to a target eNodeB. The X2 interface provides a direct forwarding path between the two eNodeBs 302. The user plane protocol stack on the X2 interface uses GPRS Tunneling Protocol User data (GTP-U) tunneling.

The EPC portion of the LTE network 350 includes one or more Packet Data Network Gateways (PGWs) 308 interfacing to a core network 202, such as the Internet, and connected to a Serving Gateway (SGW) 306 via, for example, S5 (non-roaming) or S8 (roaming) PMIP-GRE interfaces. The X2 interface is optional, and may not be available between a given source and target eNodeB 302. In this case, an indirect forwarding path exists over an S1-U interface between eNodeB 302 and the SGW 306. Like X2, the user plane on the S1-U interface uses GTP-U. Associated with the SGW 306 is a Mobility Management Entity (MME) 304. The SGW 306 is the termination point of the packet data interface to the E-UTRAN access network. When a UE 134 moves across eNodeBs 302 in the E-UTRAN, the SGW 306 serves as the local mobility anchor point routing packets towards the UE 134 for intra E-UTRAN mobility as well as mobility with other 3GPP technologies. The MME 304 is in charge of the control plane functions related to subscriber and session management. Other EPC nodes, such as a Policy Charging and Rules Function (PCRF) node, Authentication, Authorization and Accounting (AAA) node, and the like, are not depicted in FIG. 3 for clarity.

The protocols used to provide video content from the CDN 116 to UE (target video content consumption devices) 134 are selected based upon the content provider, the content itself, and/or the UE 134. Adaptive streaming for video content is supported, for example, on HTTP, Real-Time Messaging Protocol (RTMP), and Real-time Transport Protocol (RTP). Since a typical CDN 116 serves many different types of video content consumption devices 134, at any particular time, video content consumption devices 134 are typically accessing video content from many different streaming CDN servers 310, which results in many different HTTP, RTMP and RTP sessions through core network 202 and through the packet core 350.

According to various embodiments of the present invention, in addition to a plurality of CDN feed soft probes 201e deployed within the CDN 201e, another type of soft probe, referred to herein as packet core probes 320, may be employed to passively monitor and collect signaling data from one or more interfaces in the packet core 350. The plurality of packet core probes 320 deployed in various parts of the core network 350, as shown in FIG. 3, may collect user plane and control plane data from the EPC and eUTRAN interfaces, including, for example, the S1-MME, S6a, S10, and S11 interfaces that terminate at the MME 304, the S1-MME and X2 interfaces that terminate at the eNodeB 302, and the S11, S1-U, and S5/S8 interfaces that terminate at the SGW 306. It will be understood that some or all of the other interfaces or links in the packet core 350 may also be monitored by the packet core probes 320.

According to an embodiment of the present invention, the data captured by the plurality of soft probes, including the CDN feed probes 201e and the packet core probes 320, may be correlated and processed in the centralized network monitoring system 313. The monitoring system 313 may comprise, in one embodiment, one or more processors running one or more software applications, such as video session monitor program 314 that may be configured to collect, correlate and analyze data captured by the soft probes from both CDN 116 and the packet core 350. A communication network 300 operator may access this analyzed information using, for example, a workstation (not shown in FIG. 3). Captured data may be stored by the monitoring system 313 in a database 316.

It will be understood that FIGS. 1-3 are intended to provide a brief, general description of an illustrative and/or suitable exemplary network computing environment in which embodiments of the present invention described herein may be implemented. A particular embodiment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Various embodiments of the present invention contemplate that video content will be delivered to various end-user devices via a streaming communications protocol. Examples of different streaming protocols are: HTTP Live Streaming (HLS), IP Multicast, Microsoft Smooth Streaming, MPEG-DASH, Adobe HTTP Dynamic Streaming, and the like.

HLS is a known, HTTP-based streaming technology from Apple, Inc. The overall data stream in HLS is broken down into a sequence of small HTTP-based file downloads, each download providing one short piece (e.g., a limited number of video frames or audio frames) of the electronic information content in a transport stream. As the stream is played out, the receiving device may select from a number of different alternative streams containing the same electronic information content encoded at a variety of data rates, allowing the streaming session to adapt to the available data rate. Since HLS uses only standard HTTP transactions, HLS is capable of traversing any firewall or proxy server that lets through standard HTTP traffic, unlike protocols based on the datagram Protocol (UDP) such as Real-time Transport Protocol (RTP). Further, the use of standard HTTP transactions allows a CDN to easily be implemented for any given stream.

IP Multicast is a method of sending IP datagrams to multiple receivers in a single transmission. IP Multicast is typically employed for streaming media applications on managed data networks.

Microsoft Smooth Streaming is an extension of IIS Media Services. The acronym "IIS" stands for "Internet Information Services" which is a web server application and comprises a set of feature extension modules created by Microsoft for use with Microsoft Windows. The Media Services extension integrates a media delivery platform with IIS to manage and administer delivery of rich media and other Web content.

MPEG-DASH is an MPEG standard for Dynamic Adaptive Streaming of HTTP (DASH) for Internet TV. MPEG-DASH is a video streaming solution where small pieces of video files are requested by the client device and spliced together by the client device. In other words, the client device controls the delivery of the video files.

Adobe HTTP Dynamic Streaming is configured for on-demand and live video streaming online. This delivery method enables on-demand and live adaptive bitrate video streaming of standards-based MP4 media over regular HTTP connections.

Figure 4:
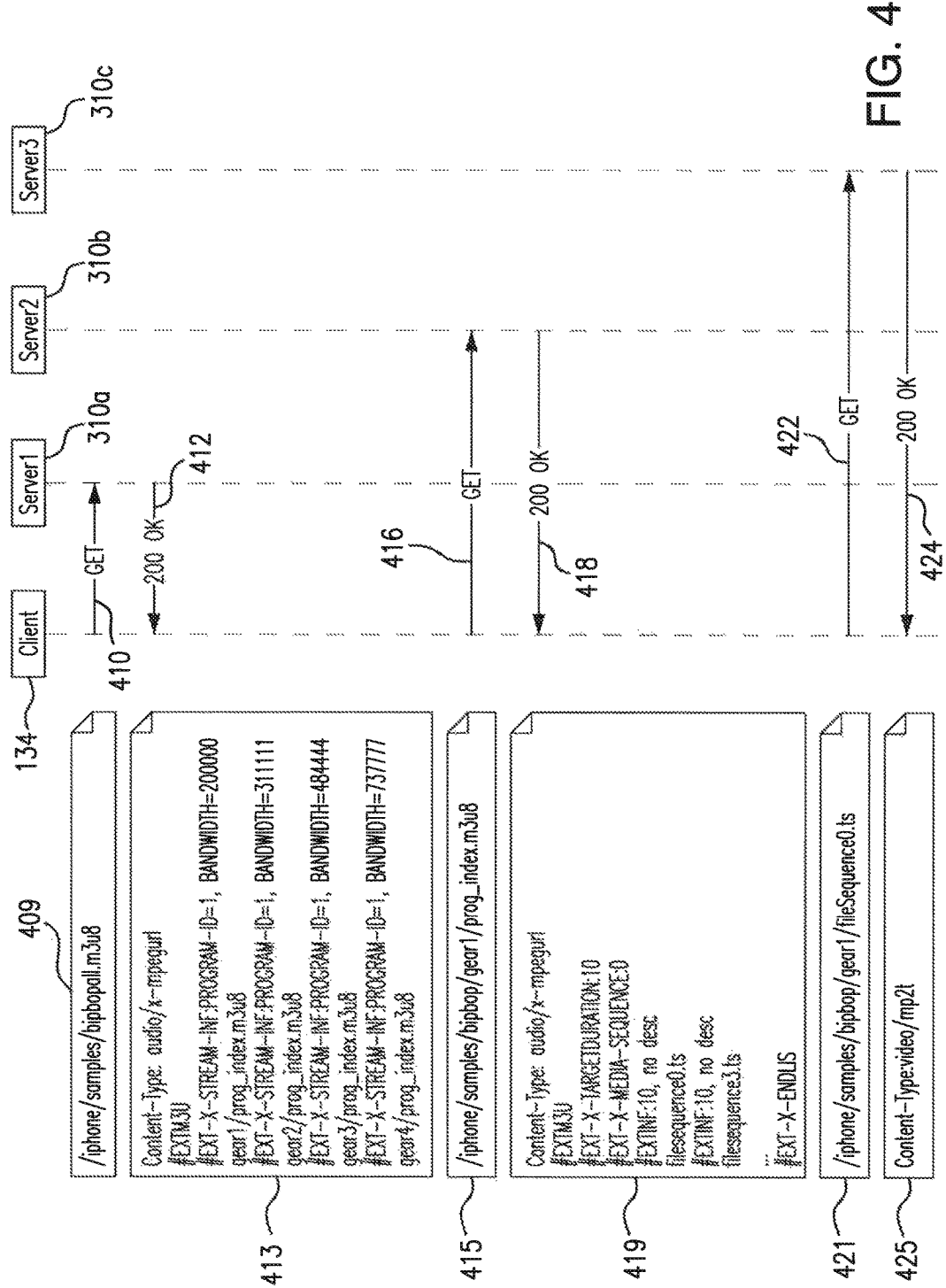
FIG. 4 is a diagram illustrating HTTP communication between a client device and multiple CDN servers, in accordance with an illustrative embodiment of the present invention.

FIG. 4 is a diagram illustrating a HTTP communication session between a client device 134 and multiple CDN servers 310a-310c, in accordance with an illustrative embodiment of the present invention. It is noted that any end user's video streaming session may involve multiple CDN servers 310a-310c due to load balancing, for example. As illustrated, CDN servers 310a-310c are configured to enable video streaming using HLS protocol. However, the invention is not so limited, and other streaming protocols may also be employed, without departing from the scope of the invention.

As shown in FIG. 4, the end user (client) device 134, after establishing a communication session with first CDN server 310a (e.g., Netflix server) may issue a first HTTP get request 410 to first CDN server 310a. It is noted that session initiation protocol may involve authentication of the client device 134. According to an embodiment of the present invention, the first HTTP get request 410 includes an identifier (e.g., a number, a name, a title, etc.) information 409 associated with a storage location (e.g., a uniform resource identifier (URI)) corresponding to the video asset. The video assets may include VOD video content, Pay-Per-View (PPV) video content, rented video content, free television content (e.g., from free television broadcasters, etc.), paid for television content (e.g., from pay television content providers), on-line video content (e.g., on-line television programs, movies, videos, etc.), advertising, games, music videos, promotional information (e.g., such as previews, trailers, etc.), etc. According to an embodiment to the present invention, in response to receiving the first HTTP get request 409, the first CDN server 310a may issue a first response 412, which may include at least content manifest 413. Such content manifest 413, depending on the utilized protocol, typically describes the relation between the different segment streams and the location where the segments may be retrieved, A segment stream may relate to a stream comprising segment data which may be retrieved by a streaming protocol, i.e. HLS protocol in the illustrated example.

As previously indicated, for various reasons load balancing) the CDN 116 may forward second 416 and third 422 HTTP get requests issued by the client device 134 to different CDN servers, such as second CDN server 310b and third CDN server 310c, respectively, shown in FIG. 4. It is noted that both second 416 and third 422 requests include identifier information (URIs) 415 and 421 associated with storage locations of corresponding video stream segments. In accordance with an embodiment of the present invention, both second 418 and third 424 responses issued by the second 310b and third 310c CDN servers, respectively, include content manifest information 419 and 425 indicative of content type. In the illustrated examples, first 310a, second 310b and third 310c servers may be disbursed geographically within the CDN 1116. Consequently, each of the deployed CDN feed probes 201e that may monitor a particular CDN server is not likely to detect all HTTP transactions related to one streaming video session, such as video session illustrated in FIG. 4. However, in accordance with an embodiment of the present invention, all HTTP transactions corresponding to the same streaming session can be correlated by the centralized network monitoring system 313 based on the identifier information and/or content manifest information included in each request and/or response. This novel correlation process will be explained in more detail below.

Figure 5:
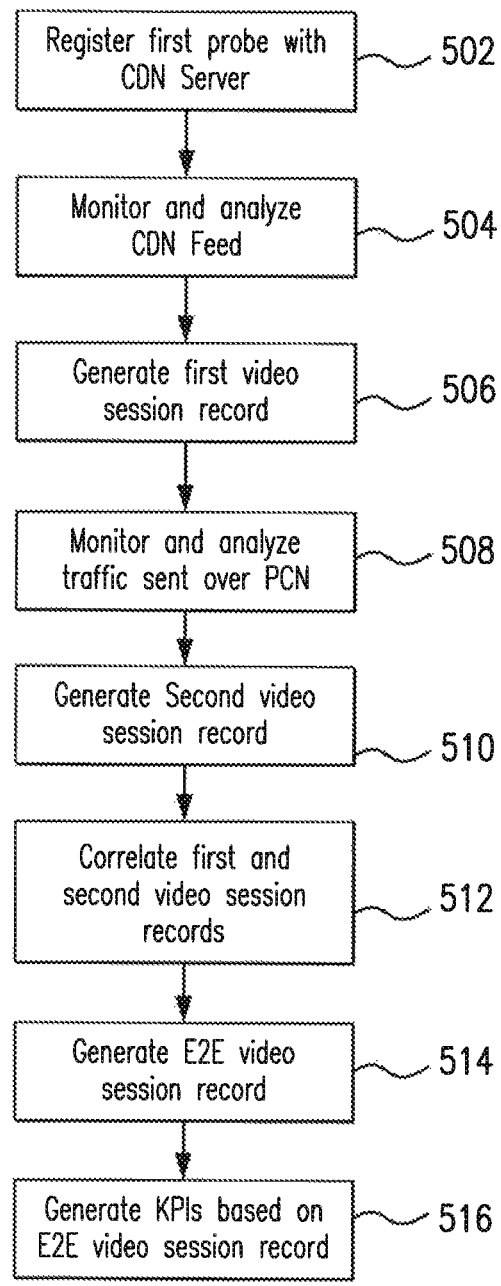
FIG. 5 is a flowchart of operational steps of the video session monitor module of FIG. 3, in accordance with an illustrative embodiment of the present invention.

FIG. 5 is a flowchart of operational steps of the video session monitor module 314 of FIG. 3, in accordance with exemplary embodiments of the present invention. Before turning to description of FIG. 5, it is noted that the flow diagram shown therein is described, by way of example, with reference to components shown in FIGS. 1-4, although these operational steps may be carried out in any system and are not limited to the scenario shown in the aforementioned figure. Additionally, the flow diagram in FIG. 5 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

The video session monitor 314 may generally be a software module or application that coordinates and controls end-to-end monitoring of streaming video sessions within the communication network 300. At 502, the video session monitor 314 preferably registers one or more CDN feed soft probes 201e deployed in the CDN 116 with one or more CDN servers 310. In one embodiment, the video session monitor 314 transmits a registration request that specifies the intent of the one or more CDN feed soft probes 201e to collect video asset information from the corresponding CDN server 310. For example, the CDN servers 310a-310c may generate trace records that record information associated with a video session. In response to receiving such registration event, each CDN server 310 may start sending CDN feed in the form of video session trace information to the registered one or more CDN feed soft probes 201e. In the alternative embodiment, each CDN server 310 may record video session trace information in the text files, database and/or other storage (not shown in FIG. 3) associated with each CDN server 310. The one or more CDN feed probes 201e may periodically query such storage in order to retrieve relevant video session trace information.

Next, at 504, the video session monitor 314 preferably receives and analyzes CDN feed information provided by the one or more CDN feed probes 210e monitoring multiple streams of video content sent over the one or more CDNs 116. The received data may include information related to sessions that occur between a unique client device 134/CDN server 310 pair. As discussed above with reference to FIG. 4, video asset URI, which typically contains video asset name or title is the key that can be used to join related video downloading segments into a holistic session, so that various performance related parameters across multiple CDN servers 310 can be viewed and analyzed together. In addition, the video session monitor 314 may use end user device IP addresses for correlation purposes. It is noted that HTTP-based streaming video sessions are always initiated by the client device 134, for example, by issuing a first HTTP get request 410 to first CDN server 310a shown in FIG. 4. The IP address of such client device 134 remains the same throughout the given video session. Thus, in one embodiment, at 504, the video session monitor 314 may correlate disjoint video segment transfers using at least the URI mapping and using received IP information associated with a corresponding client device 134. This type of correlation enables the video session monitor 314 to derive session-based, network based as well as video asset based performance characteristics.

At 506, the video session monitor 314 preferably generates one or more first video session records. In a preferred embodiment the one or more first video session records will contain information related to all HTTP communication transactions between a unique pair of client device 134 and a corresponding CDN server 310. In addition, according to an embodiment of the present invention, the aforementioned request URIs and content manifests contained within each HTTP request should also be included in the one or more first video session records to facilitate further correlation.

At 508, the video session monitor 314 may monitor and analyze information related to HTTP traffic sent over the packet core network 350 obtained by the plurality of packet core probes 320 deployed in various parts of the packet core network 350, as shown in FIG. 3. It is noted that the plurality of packet core probes 320 may process all signaling information related to streaming video HTTP messages in the packet core network 350. The video session monitor 314 may accumulate and store the received information, for example in database 316 for further analysis. In an embodiment of the present invention, the video session monitor 314 may utilize text pattern based rules to identify and classify streaming video traffic in accordance with the following table 1:

TABLE 1

| Traffic Type | Classification Rule |
| --- | --- |
| Progressive Download | No manifest (Content-Type contains 'video/x-flv' OR 'flv-application/octet-stream') AND (Content contains 'FLV') (Content-Type contains 'video/mp4' or 'application/octet-stream') AND (Content contains 'moov') (Content-Type contains 'video/webm') AND (Content contains 'webm') |
| Apple HTTP Live Streaming | Manifest: Request URI contains '.m3u8' OR '.m3u' Media: Request URI contains '.ts' |
| Adobe HTTP Dynamic Streaming | Manifest: (Request URI contains '.f4m') AND (Response Content-Type contains 'video/f4m') Media: Content-Type contains 'video/f4f' |
| Microsoft Smooth Streaming | Manifest: Request URI contains '.ismc' OR '.ism/Mfest' OR '.ism/Manifest' OR '.isml/Manifest' Media: Request URI contains '.isma' OR '.ismv' |
| MPEG DASH | Manifest: (Request URI contains '.mpd') AND (Response Content-Type contains 'application/dash+xml') |

In other words, the video session monitor 314 may classify all received streaming video segments based on the utilized streaming protocol. For instance, if the video session monitor 314 determines that a particular HTTP request contains '.m3u8' or '.m3u', the video session monitor 314 may classify this video stream segment as utilizing Apple HTTP Live Streaming protocol. Similarly, if the video session monitor 314 determines that a particular HTTP request URI contains '.mpd' and the corresponding response content-type contains 'application/dash+xml' string, the video session monitor 314 may classify this video stream as utilizing MPEG DASH protocol, and so on.

Once the streaming protocol associated with each streaming fragment is identified, according to an embodiment of the present invention, the video session monitor 314 may perform additional processing to join all fragments related to the same video session. For all Progressive Download fragments the video session monitor 314 may utilize a combination of <Client IP, Client Port, Server IP, Server Port> as a session correlation key.

It is noted that Apple HTTP Live Streaming, MPEG DASH and Microsoft Smooth Streaming protocols are substantially similar to each other. More specifically, a content manifest or playlist is typically used to direct a client (e.g., client 134) to different streaming CDN servers (e.g. servers 310a-310c). Therefore, to join various fragments that belong to the same streaming video session the video session monitor 314 may utilize manifest parsing and URI mapping processes. For instance, continuing with the example illustrated in FIG. 4, the video session monitor 314 may generate the following URI mapping table 2:

TABLE 2

| Request URI | Manifest | Segment |
| --- | --- | --- |
| Bipbopall.m3ua | gear1/prog_index.m3u8 | gear1/fileSequence0.ts gear1/fileSequence1.ts gear1/fileSequence2.ts gear1/fileSequence3.ts |
| | gear2/prog_index.m3u8 gear3/prog_index.m3u8 gear4/prog_index.m3u8 | |

It is noted that the video session monitor 314 may use the IP address of the client device and the identified request URI as a correlation key.

With respect to Adobe HTTP Dynamic Streaming fragments, this protocol typically packages media files into fragments that client devices having a Flash Player installed on them can access such files instantly without downloading the entire file. In other words, HTTP streaming segment comprises a separate URL resource (file). Thus a predefined URL scheme can address each HTTP streaming fragment uniquely. For instance, the URL for an HTTP streaming fragment may be constructed according to the following scheme:

//<ServerBaseURL>/<MovieIdentifier><QualitySegmentURLModifier>Seg<SegmentNumber>Frag<Fragment Number>

Consequently, for the streaming video session segments identified as Adobe HTTP Dynamic Streaming segments the video session monitor 314 may extract the IP address of the client device and the MovieIdentifier elements from the corresponding URL and may use this combination as a correlation key for binding fragments belonging to the same video streaming session.

Referring back to FIG. 5, at 510, the video session monitor 314 may generate one or more second video session records based on the information correlated at step 508 above. In a preferred embodiment the one or more second video session records will contain at least the correlated segments detected by the plurality of packet core probes 320 deployed in various portions of the packet core network 350. At 512, the video session monitor 314 preferably correlates the one or more first video session records to the one or more second video session records. As previously indicated, first video session records include information related to client device's IP address and URI information associated with a unique pair of client device 134 and CDN server 310. Second video session records should include requests to different streaming CDN servers 310a-310c detected in the packet core network 350 and correlated based on the corresponding URIs. According to an embodiment of the present invention, the video session monitor 314 may utilize a multiple protocol correlation technique known in the art to correlate the one or more first video session records with the one or more second video session records. Based on this correlation, at 514, the video session monitor 314 may generate a comprehensive subscriber-based third video session record that represents an end to end communication between a particular subscriber's device 134 and one or more CDN servers 310a-310c across the communication network 300.

At 516, the video session monitor 314 may generate one or more performance characteristics (e.g., calculate a Key Performance Indicator (KPI)) that correspond to an end-to-end video streaming session based, at least in part, on the third video session record. Various performance characteristics may be generated for each of the respective streaming video sessions by means of analytical models.

In summary, various embodiments of the present invention describe a novel telecommunication network monitoring approach that offers CSPs a cost-effective and service agnostic video stream monitoring solution capable of receiving, processing and correlating the streaming video service performance with large amounts of video production and user agent data without adding a significant overhead. Advantageously, in a preferred embodiment, the video session monitor 314 analyzes content manifest associated with a particular video streaming session, classifies all received streaming video segments based on the identified streaming protocol and correlates streaming video segments that belong to the same streaming video session. Various embodiments of the present invention introduce a new approach aimed at shifting substantially all end-to-end video streaming monitoring responsibilities to the centralized network monitoring framework, which is enabled to proactively ensure that a given video stream is fully functional and operational across all stages of end-to-end content delivery to the end users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
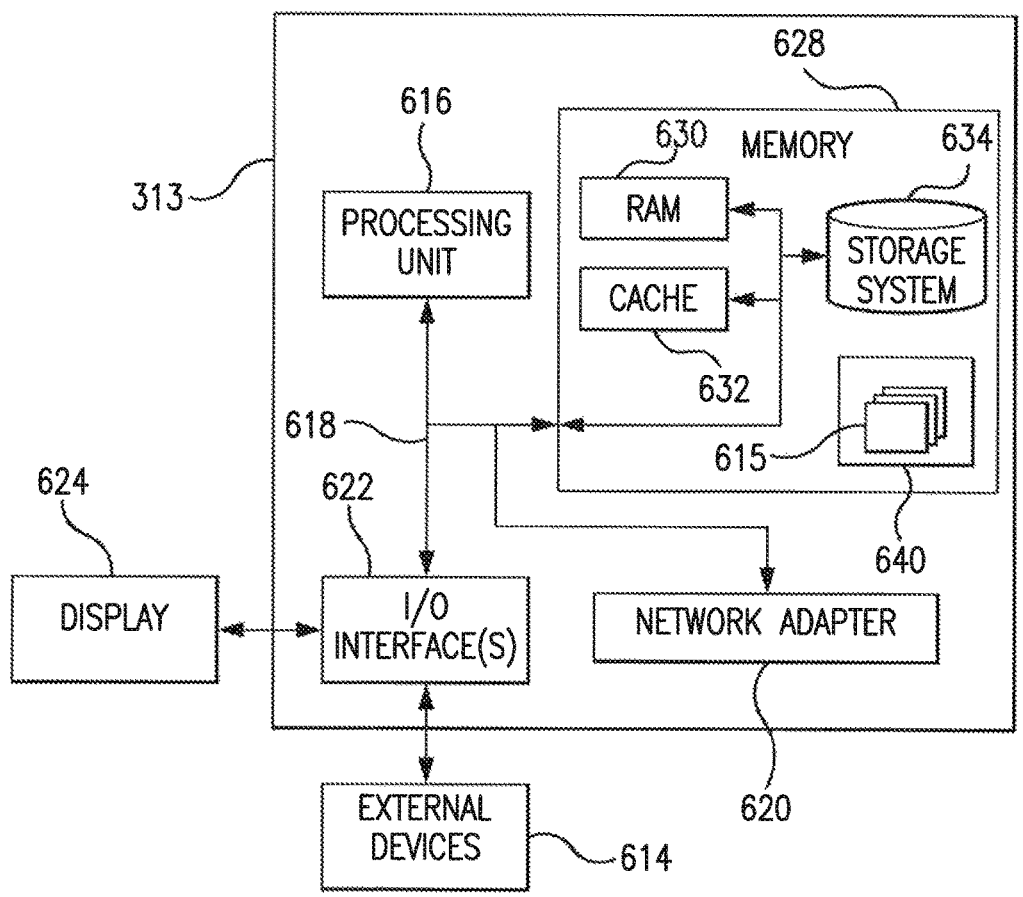
FIG. 6 is a block diagram illustrating a typical CDN server that may be employed to implement one or more processing functionality described herein, according to some embodiments illustrated herein.

Embodiments of streaming video session monitoring framework may be implemented or executed by centralized monitoring servers comprising one or more computer systems. One such monitoring server 313 is illustrated in FIG. 6. In various embodiments, monitoring server 313 may be a server, a mainframe computer system, a workstation, a network computer, a desktop computer, a laptop, or the like.

Monitoring server 313 is only one example of a suitable system and is not intended to suggest any limitation as to the scope of use or functionality of embodiments of the invention described herein. Regardless, monitoring server 313 is capable of being implemented and/or performing any of the functionality set forth hereinabove.

Monitoring server 313 may be described in the general context of computer system-executable instructions, such as program modules, being executed by a computer system. Generally, program modules may include routines, programs, objects, components, logic, data structures, and so on that perform particular tasks or implement particular abstract data types. Monitoring server 313 may be practiced in distributed data processing environments where tasks are performed by remote processing devices that are linked through a communications network. In a distributed data processing environment, program modules may be located in both local and remote computer system storage media including memory storage devices.

Monitoring server 313 is shown in FIG. 6 in the form of a general-purpose computing device. The components of monitoring server 313 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Monitoring server 313 typically includes a variety of computer system readable media. Such media may be any available media that is accessible by monitoring server 313, and it includes both volatile and non-volatile media, removable and non-removable media.

System memory 628 can include computer system readable media in the form of volatile memory, such as random access memory (RAM) 630 and/or cache memory 632. Monitoring server 313 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 615, such as video session monitor 314, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the invention as described herein.

Monitoring server 313 may also communicate with one or more external devices 614 such as a keyboard, a pointing device, a display 624, etc.; one or more devices that enable a user to interact with monitoring server 313; and/or any devices (e.g., network card, modem, etc.) that enable monitoring server 313 to communicate with one or more other computing devices. Such communication can occur via Input/Output (I/O) interfaces 622. Still yet, monitoring server 313 can communicate with one or more networks such as a local area network (LAN), a general wide area network (WAN), and/or a public network (e.g., the Internet) via network adapter 620. As depicted, network adapter 620 communicates with the other components of monitoring server 313 via bus 618. It should be understood that although not shown, other hardware and/or software components could be used in conjunction with monitoring server 313. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring streaming video content, the method comprising:
    registering, by a processor, first and second software probes with respective first and second Content Delivery Network (CDN) servers of a plurality of CDN servers, the registration indicating that the first and second software probes are assigned to collect trace information related to a Video on Demand (VoD) session from the respective first and second CDN servers during a streaming VoD session,
    wherein the first and second CDN servers each store VoD content, and wherein a client device initiated the streaming VoD session by requesting the VoD content from one of the first or second CDN server, and client device's request includes identification of the client device and identification of at least one of the VoD content and a storage location of the VoD content being streamed by the corresponding one of the first or second CDN server;
    receiving, monitoring and analyzing, by the processor, the trace information collected by the first and second software probes during the streaming VoD session;
    determining, by the processor, the trace information collected by the first and second software probes belonging to the same streaming VoD session based on the identification of the client device and identification of at least one of the VoD content and a storage location of the VoD content being streamed by the corresponding first or second CDN server;
    generating, by the processor, a first VoD session record that includes the trace information collected by the first and second software probes that were determined to belong to the same streaming VoD session;
    receiving, by the processor, packet core network (PCN) signaling data collected by at least a third and fourth PCN software probe deployed in a PCN, the PCN signaling data including messages that identify the client device and URI information associated with the requested VoD content;
    monitoring and analyzing, by the processor, the PCN signaling data;
    determining, by the processor, the PCN signaling data belonging to the streaming VoD session based at least on a streaming protocol used, identification of the client device, and URI information associated with the requested VoD content, wherein the PCN signaling data determined to belong to the streaming VoD session is provided by multiple CDN servers of the plurality of CDN servers;
    generating, by the processor, a second VoD session record that includes the PCN signaling data sent over the PCN and collected by the one or more PCN software probes that were determined to belong to the streaming VoD session;
    correlating, by the processor, the first and second VoD session records using information included in the first and second VoD session records including identification of at least one of the client device and URI information associated with the requested VoD content; and
    generating, by the processor, a third session record that is based on and includes the correlated first and second VoD session records.

2. The method of claim 1, wherein monitoring and analyzing the trace information comprises monitoring and analyzing multiple streams of VoD content sent over the first and second CDN servers.

3. The method of claim 2, wherein said VoD content comprises at least one of standard definition VoD content or high definition VoD content and the streaming VoD sessions are offered over Hypertext Transfer Protocol (HTTP).

4. The method of claim 1, wherein monitoring and analyzing the trace information comprises transmitting, by the first and second CDN servers, at least two respective session traces as trace information to the first and second software probes.

5. The method of claim 1, wherein monitoring and analyzing the trace information comprises:
    storing at least two session traces as trace information in a storage component of the first and second CDN servers; and
    periodically provide for retrieval by the first and second software probes, the respective at least two session traces stored in the storage component of the first and second CDN servers.

6. The method of claim 1, wherein the request is an HTTP request that has an associated Uniform Resource Identifier (URI) that identifies the requested VoD content; and the responses from the first and second CDN servers are HTTP responses, wherein the URI associated with the HTTP request is used to correlate the first and second session records.

7. The method of claim 6, wherein said correlating the first session record to the second session record is performed based on URI mapping and based on the IP address of the client device.

8. A computer program product for monitoring streaming video content, the computer program product comprising:
    one or more hardware computer-readable storage devices and a plurality of program instructions stored on at least one of the one or more computer-readable storage devices, the plurality of program instructions comprising:
    program instructions to register first and second software probes with respective first and second Content Delivery Network (CDN) servers of a plurality of CDN servers, the registration indicating that the first and second software probes are assigned to collect trace information related to a Video on Demand (VoD) session from the respective first and second CDN servers during a streaming VoD session,
    wherein the first and second CDN servers each store VoD content and wherein a client device initiated the streaming VoD session by requesting the VoD content from one of the first or second CDN server, and client device's request includes identification of the client device and identification of at least one of the VoD content and a storage location of the VoD content being streamed by the corresponding one of the first or second CDN server;

program instructions to receive, monitor and analyze the trace information collected by the first and second software probes during the streaming VoD session;

program instructions to determine the trace information collected by the first and second software probes belonging to the same streaming VoD session based on the identification of the client device and the identification of at least one of the VoD content and a storage location of the VoD content being streamed by the corresponding first or second CDN server;

program instructions to generate a first VoD session record that includes the trace information collected by the first and second software probes that were determined to belong to the same streaming VoD session;

program instructions to receive packet core network (PCN) signaling data collected by at least a third and fourth PCN software probe deployed in a PCN, the PCN signaling data including messages that identify the client device and URI information associated with the requested VoD content;

program instructions to monitor and analyze the PCN signaling data;

program instructions to determine the PCN signaling data belonging to the streaming VoD session based at least on a streaming protocol used, identification of the client device, and URI information associated with the requested VoD content, wherein the PCN signaling data determined to belong to the streaming VoD session is provided by multiple CDN servers of the plurality of CDN servers;

program instructions to generate a second VoD session record that includes the PCN signaling data sent over the PCN and collected by the one or more PCN software probes that were determined to belong to the streaming VoD session;

program instructions to correlate the first and second VoD session records using information included in the first and second VoD session records including identification of at least one of the client device and URI information associated with the requested VoD content; and program instructions to generate a third session record that is based on and includes the correlated first and second VoD session records.

9. The computer program product of claim 8, wherein the program instructions to monitor and analyze the trace information comprises monitoring and analyzing multiple streams of VoD content sent over the first and second CDN servers.

10. The computer program product of claim 9, wherein said VoD content comprises at least one of standard definition VoD content or high definition VoD content and the streaming VoD sessions are offered over Hypertext Transfer Protocol (HTTP).

11. The computer program product of claim 8, wherein the program instructions to monitor and analyze the trace information comprises program instructions to transmit, by the first and second CDN servers, at least two respective session traces as trace information to the first and second software probes.

12. The computer program product of claim 8, wherein the program instructions to monitor and analyze trace information comprises program instructions to:

store at least two session traces as trace information in a storage component of the first and second CDN servers; and periodically provide for retrieval by the first and second software probes, the respective at least two session traces stored in the storage component of the first and second CDN servers.

13. The computer program product of claim 10, wherein the request is an HTTP request that has an associated Uniform Resource Identifier (URI) and the responses from the first and second CDN servers are HTTP responses, wherein the URI associated with the HTTP request is used to correlate the first and second session records.

14. A computer system for monitoring streaming video content, the computer system comprising one or more processors, one or more hardware computer-readable storage devices, and a plurality of program instructions stored on at least one of the one or more storage devices for execution by at least one of the one or more processors, the plurality of program instructions comprising:

program instructions to register first and second software probes with respective first and second Content Delivery Network (CDN) servers of a plurality of CDN servers, the registration indicating that the first and second software probes are assigned to collect trace information related to a Video on Demand (VoD) session from the respective first and second CDN first and second during a streaming VoD session, wherein the first and second CDN servers each store VoD content and wherein a client device initiated the streaming VoD session by requesting the VoD content from one of the first or second CDN server, client device's request includes identification of the client device and at least one of the VoD content and a storage location of the VoD content being streamed by the corresponding one of the first or second CDN server;

program instructions to receive, monitor and analyze the trace information collected by the first and second software probes during the streaming VoD session;

program instructions to determine the trace information collected by the first and second software probes belonging to the same streaming VoD session based on the identification of the client device and identification of at least one of the VoD content and a storage location of the VoD content being streamed by the corresponding first or second CDN server;

program instructions to generate a first VoD session record that includes the trace information collected by the first and second software probes that were determined to belong to the same streaming VoD session;

program instructions to receive packet core network (PCN) signaling data collected by at least a third and fourth PCN software probe deployed in a PCN, the PCN signaling data including messages that identify the client device and URI information associated with the requested VoD content;

program instructions to monitor and analyze the PCN signaling data;

program instructions to determine the PCN signaling data belonging to the streaming VoD session based at least on a streaming protocol used, identification of the client device, and URI information associated with the requested VoD content, wherein the PCN signaling data determined to belong to the streaming VoD session is provided by multiple CDN servers of the plurality of CDN servers;

program instructions to generate a second VoD session record that includes the PCN signaling data sent over the PCN and collected by the one or more PCN software probes that were determined to belong to the streaming VoD session;

program instructions to correlate the first and second VoD session records using information included in the first and second VoD session records including identification of at least one of the client device and URI information associated with the requested VoD content; and program instructions to generate a third session record that is based on and includes the correlated first and second VoD session records.

15. The computer system of claim 14, wherein the program instructions to monitor and analyze the trace information comprises monitoring and analyzing multiple streams of VoD content sent over the first and second CDN servers.

16. The computer system of claim 15, wherein said VoD content comprises at least one of standard definition VoD content or high definition VoD content and the streaming VoD sessions are offered over Hypertext Transfer Protocol (HTTP).

17. The computer system of claim 14, wherein the program instructions to monitor and analyze trace information comprises program instructions to transmit, by the first and second CDN servers, at least two respective session traces as trace information to the first and second software probes.

18. The method of claim 1, further comprising generating one or more performance characteristics associated with the third session record to determine a need for a repair in response to a lack of functionality indicated by the performance characteristics.

19. The method of claim 1, further comprising submitting a representation of the third session record for display.

20. The method of claim 1, further comprising generating, by the processor, one or more quality of service performance characteristics corresponding to the third session record.

\* \* \* \* \*